US005717402A

United States Patent [19]

Chu

[11] Patent Number: 5,717,402

[45] Date of Patent: Feb. 10, 1998

[54] GPS REFERENCE CLOCK GENERATOR

[76] Inventor: Peter Chu, 13965 Sagewood Dr., Poway, Calif. 92064

[21] Appl. No.: 353,071

[22] Filed: Dec. 9, 1994

[51] Int. Cl.$^6$ .......... G01S 5/02

[52] U.S. Cl. .......... 342/357; 331/73; 331/158

[58] Field of Search .......... 342/352, 357; 331/73, 139, 155, 158, 175

[56] References Cited

U.S. PATENT DOCUMENTS

| | | | |
|---|---|---|---|
| 4,740,761 | 4/1988 | Barnes et al. | 331/3 |
| 4,849,993 | 7/1989 | Johnson et al. | 375/108 |
| 4,872,765 | 10/1989 | Schodowski . | |
| 4,899,117 | 2/1990 | Vig | 331/3 |
| 5,487,183 | 1/1996 | Nanni et al. | 455/113 |

OTHER PUBLICATIONS

A GPS Primary Reference Clock, Microwave Journal, Nov. 93.

Design Aspects of an Oscillator Using the SC Cut Crystal by Robert Burgoo and Robert L. Wilson, Hwelett–Packard Co. Resonators for the Microcomputer Compensated Crystal Oscillator by Raymond L. Filler and John R. Viggs.

*Primary Examiner*—Thomas H. Tarcza
*Assistant Examiner*—Dao L. Phan
*Attorney, Agent, or Firm*—Curtis L. Harrington

[57] ABSTRACT

The GPS-disciplined clock consists of two digital phase locked loops. The first, Loop 1, tracks the crystal oscillator's third overtone vs. fundamental frequency variation with a numerical controlled oscillator, NCO1; The second digital phase locked loop, Loop 2, tracks the GPS satellite receiver's 1PPS signal vs. the crystal oscillator's frequency counter output variation with another numerical controlled oscillator, NCO2. When the satellites are in view, the embedded computer writes the two NCOs tracking record onto a memory; while the satellites are not in view, the computer directs a digital frequency synthesizer to generate frequency according to the tracking records stored in the memory. The hardware implementation of the inventive design is mostly digital, but a very-large-scale ASIC can be used to miniaturize the whole GPS-Synchronized clock system, making it a battery-powered, truly portable, and easy to be integrated into other instruments.

2 Claims, 4 Drawing Sheets

GPS REFERENCE CLOCK GENERATOR

FIELD OF THE INVENTION

The present invention relates to the field of crystal oscillator devices. More specifically, the present invention relates to a Global Positioning System (GPS) satellite disciplined device, having a dual mode crystal oscillator and achieves accuracy in frequency control and stability with respect to variations in temperature.

BACKGROUND OF THE INVENTION

The global-positioning-system (GPS) program was designed by the Department of Defense to provide very accurate navigation, time and position information worldwide. The data are available to anyone who has a GPS receiver. The time information given by the GPS is absolute time, time referenced to a specific-time-scale Universal Time Constant (UTC). It enables users to synchronize or time events to sub microsecond accuracy at wide separated locations. Especially the required time correlation of multiple events in modern test programs in both military and commercial applications can be achieved with GPS synchronized timer.

Two basic accuracy specifications for GPS disciplined clock system are (1) accuracy when satellites are in view, and (2) accuracy when no satellites have been in view for a long period of time, typically eight hours or longer.

Any conventional time source, once it has been synchronized to UTC, will begin to accumulate a time offset from UTC. How quickly this accumulates depends on the type of standard. GPS-disciplined primary reference clocks have been put on the market by several companies. For example, the TRAK model 8860 has been claimed to be as good as Cesium standard. This device was described in an article entitled "A GPS Primary Reference Clock", by TRAK Systems of Tampa Fla., in the November 1993 edition of *Microwave Journal*. Its core is a disciplined Rubidium oscillator. Its size, weight and power consumption make it only suitable for use on a bench in the laboratory. And its price is as high as one-half of the commercial Cesium beam clock.

The present invention provides a method to produce GPS-disciplined reference clock with a SC-cut crystal oscillator controlled by a micro-computer. It not only has the stability and accuracy as those with Rubidium oscillator but, the most important, also the small size and low power consumption, and cost much less to build. These features make it possible to be integrated into other system, such as telecommunication system, TV transmission and frequency/time reference for calibration of other test instruments.

It is well known that the SC-cut crystal is capable of resonating in many different modes, as described in an article entitled "Design Aspects of an Oscillator Using The SC Cut Crystal", by Robert Burgeon and Robert Wilson at the 33rd Annual Symposium on Frequency Control, 1979. Stanley S. Schodowski of U.S. Army Electronics Technology and Devices Laboratory, Fort Monmouth, N.J. 07703-5000 has developed a self-temperature-sensing resonator using a dual-harmonic-mode crystal oscillator. This was described in U.S. Pat. No. 4,872,765, entitled "Dual Mode Quartz Thermometric Sensing Device" and issued to Stanley S. Schodowski, and issued on Oct. 10, 1989 and is incorporated herein by reference, and also disclosed in the article "Resonator Self-Temperature-Sensing Using a Dual-Harmonic-Mode Crystal Oscillator" by Stanley S.

Schodowski, at the 43rd Annual Symposium on Frequency Control in 1989. Based on this dual mode oscillator's frequency-temperature characteristics, John R. Vig and Raymond L. Filler, both of U.S. Army Electronic Technology and Devices Laboratory (LABCOM), Fort Monmouth, N.J. 07703 developed a microcomputer compensated crystal oscillator. This was disclosed in the article "Resonators for the Microcomputer Compensated Crystal Oscillator" by Raymond L. Filler and John R. Vig, in the 43rd Annual Symposium on Frequency Control in 1989. A group known as Engineers in Frequency Electronics Inc., Mitchel Field, N.Y. 11553. Also designed a so-called MCXO with the same approach, as disclosed in "The Microcomputer Compensated Crystal Oscillator (MCXO)" by Martin Bloch, Marvin Meirs and John Ho, in the 43rd Annual Symposium on Frequency Control, 1989. The basic method they used is to count the frequency difference between the fundamental output and one third of the third overtone output. This scheme has processing limit: the temperature compensation is based on predetermined temperature coefficients of a SC-cut crystal's beat frequency and harmonics. These coefficients are different from unit to unit, and their accuracy and tolerance depend on the test equipment. More over the temperature sensing error due to a parameter variation limits the MCXO to $7\times10^{-9}$ (Ref. to Schodowski's article). The present invention overcomes these problems with a scheme of dual phase-locked Loops: no more need to know the temperature coefficients; the variation of the beat frequency caused by temperature is directly calibrated with the GPS satellite's frequency.

SUMMARY OF THE INVENTION

The GPS reference clock generator of the present invention uses digital signal processing to achieve very fine frequency resolution with a single IC oscillator.

The invented GPS-disciplined clock system consists of two independent digital phase locked loops. The first loop's function is to track the crystal's beat frequency with a numerical control oscillator (NCO). The second loop's function is to track the GPS receiver's 1 PPS signal with a direct-digital-synthesizer (DDS).

When the satellites are in view, the embedded computer write the tracking records of both NCO and DDS onto a memory; it is up-dated as long as the satellites are in view. While the satellites are not in view, the computer, according to the table stored in the memory, directs the DDS to operate at the frequency pointed by the current NCO value. This chart maintains the relationship between the two phase-locked-loops. It actually represents the crystal oscillator's frequency change caused by parameters variation. Thus, age and other environmental problems are eliminated.

The hardware implementation of the inventive design is mostly digital. All digital circuits can be integrated into a set of Very-Large-Scale (VLS) ASIC. The miniaturized GPS-synchronized clock system could be battery-powered, truly portable and easy to be integrated into other system.

BRIEF DESCRIPTION OF THE DRAWINGS

The invention, its configuration, construction and operation will be best further described in the following detailed description, taken in conjunction with the accompanying drawings in which.

DETAILED DESCRIPTION OF THE PREFERRED EMBODIMENT

Figure 1:
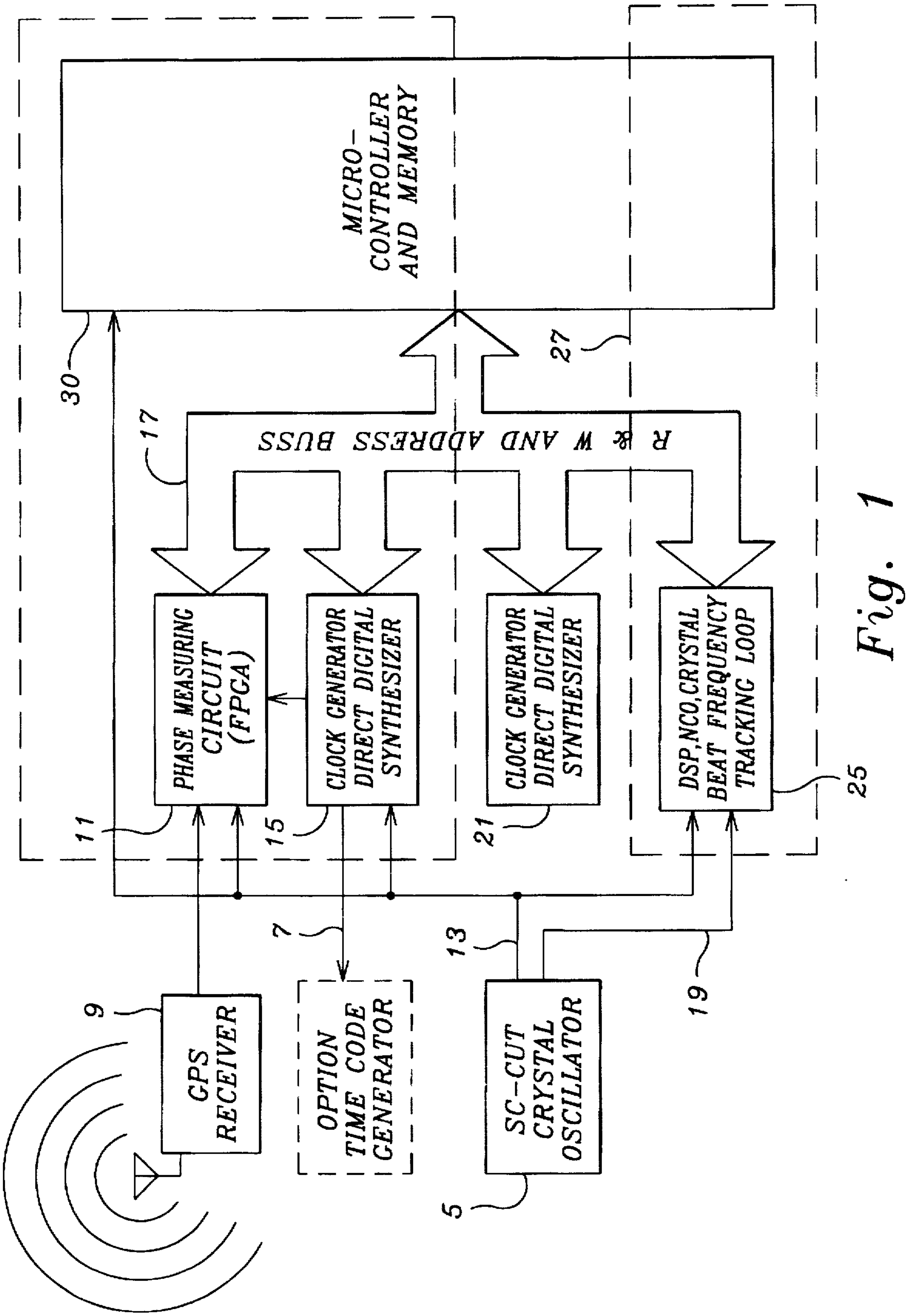
FIG. 1 shows the system functional block diagram.

FIG. 1 is the system block diagram, depicting the signal paths between each functional block. The blocks are: (1) SC-Cut Crystal Oscillator 5, (2) Phase Measuring Circuit 11 and Clock Generator 15, (3) Crystal Beat Frequency Tracking Loop 25, (4) Look-Up Table Memory 21, (5) Microcontroller 30 and its associated RAM and ROM The SC-Cut crystal oscillator 5, operating in dual mode, outputs both fundamental frequency signal F and third overtone frequency signal 3F+Δ. Either signal can be used as system clock. As FIG. 1 shown, the 3F+Δ signal is used as system clock, while F is the signal to be tracked. The system clock is used in: period counters in phase measuring circuit 11, direct-digital-synthesizer (DDS) in clock generator 15, Sample/Hold A to D converter and numerical control oscillator (NCO) in the baseband processor block 25, the Microcontroller 30 also gets clock from it. The phase measuring circuit has two binary counters gated by the 1PPS signals. The results of the counting time periods are taken by the Microcontroller for phase error processing. The clock generator 11 contains a DDS, an output analog bandpass filter and frequency divider for generating the system 1PPS signal for phase measuring circuit as well as to the time code generator (which is option, not discussed here). The phase measuring circuit and clock generator's frequency divider are implemented with a Field-Programmable-Gate-Array (FPGA).

The electromagnetic signal from the GPS satellites is shown as "signal received from antenna" and may be made available to GPS receiver in any number of ways, including amplification. When a GPS satellite is in view, and the GPS receiver 9 is in good operating condition, an output signal shown as 1PPS is made available to the phase measuring circuit 11. It detects the phase difference between the incoming 1PPS signal and the system 1PPS signal generated by the Clock Generator 15. All these together with part of Microcontroller form phase-locked-Loop #2. Microcontroller 30 takes in the phase measuring data, finds phase error, filters and integrates it, then updates the DDS frequency with the frequency word resulted from processing the phase error according to the algorithm showed in FIG. 3. In steady state tracking mode, this frequency word is to be stored in the memory 21 along with the NCO frequency word. NCO is the digital local oscillator in Phase-Locked Loop #1, tracking the SC-cut crystal oscillator's beat frequency. It will be discussed in the following section. Microcontroller 30 is a micro computer, having its own program ROM and data RAM. The popular 8051 micro-computer will fit into this application. It is the central control unit, executing multi-task real-time programs, including the two phase-locked-loop's digital signal processing and GPS receiver interface. It communicates with other blocks via address and data bus. The Look-Up Table Memory 21 is a group of Flash RAM, it can be considered as part of data memory.

Figure 2:
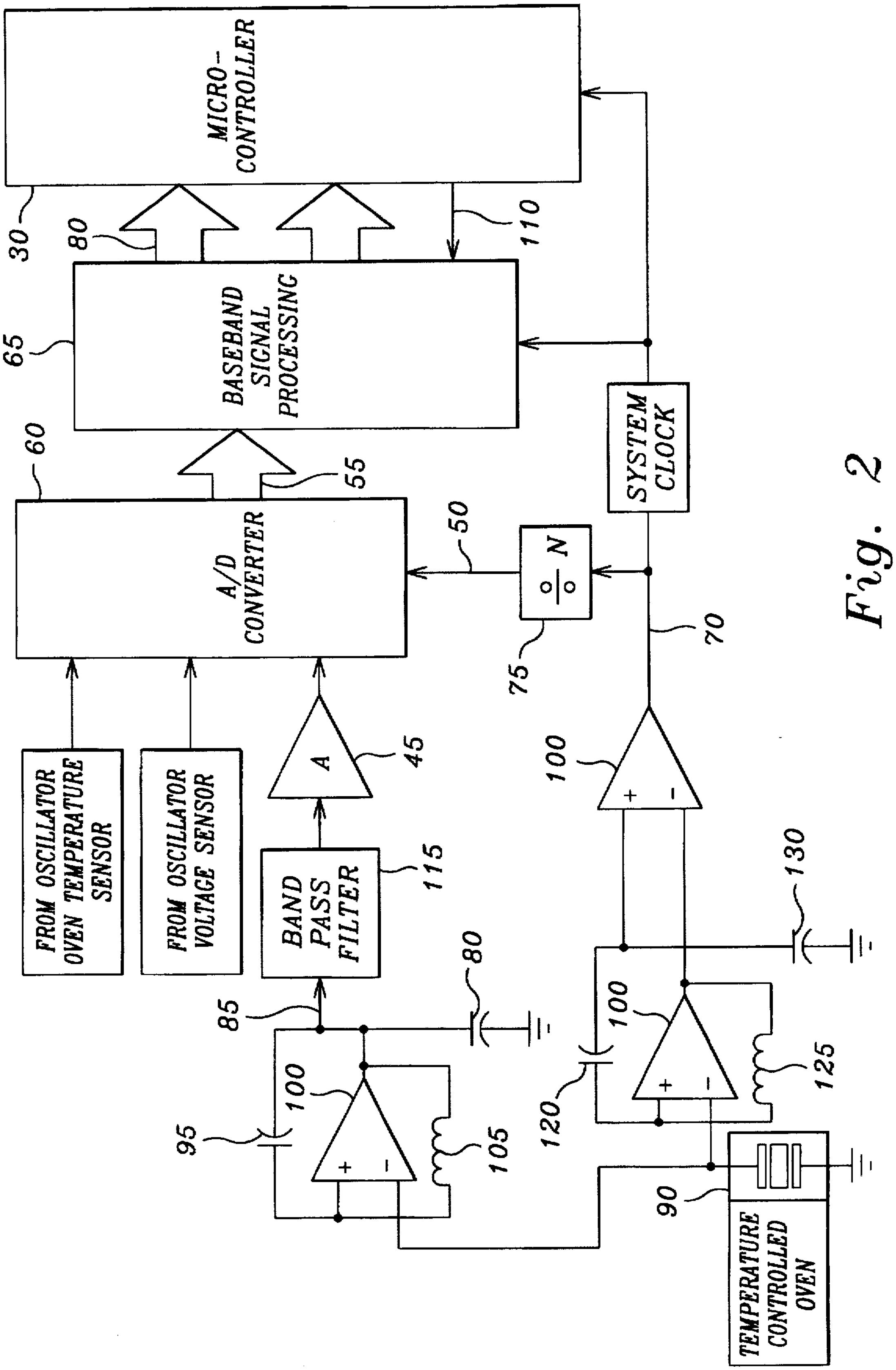
FIG. 2 shows the signal processing functions for tracking the SC-cut crystal's beat frequency.

FIG. 2 is a detail block diagram of the Beat Frequency Tracking Loop. The dual mode crystal oscillator is built with an single Emitter-Coupled Logic (ECL) IC 100, such as MC10116 triple line-receiver, basically it contains two modified Colpitts oscillators sharing the same crystal resonator 90. One third of the IC for fundamental and one third for third overtone, the other one third is used as system clock driver. The crystal is directly connected to both oscillator's negative inputs. At the positive input are a feedback capacitor from positive output and a feedback inductor from negative output. The inductor current has 90 degree phase lag. The positive output sees the capacitor and inductor in series, and appearing inductive, combining with the parallel output capacitor a LC tank is formed. Capacitor 95, inductor 105 and parallel capacitor 80 are selected to resonant at the fundamental frequency; capacitor 120, inductor 125 and parallel capacitor 130 are selected to resonant at third overtone frequency. The fundamental frequency signal F is band pass filtered and amplified, then sampled, quantized and converted into digital bits by the A to D converter 60. The sampling frequency, directly derived from the system clock 3F+Δ with the divided by N circuit 75, would be synchronous with a sub harmonic of the fundamental frequency F in the RF spectrum. When Δ=0, it causes F to be aliased to zero frequency; when Δ≠0, it would be aliased to baseband. The sample/hold circuit's frequency response should be high enough to accommodated the fundamental frequency signal F. A RF frequency mixer with analog filter can perform exactly the same down conversion function, however, it always introduces DC offset, amplitude and phase unbalanced at the baseband output. With band-pass sampling method, not only these problems can be eliminated, but also sampling and down conversion can be carried out simultaneously. The integer N in circuit 75 can be 1, 2, 3, . . . By Nyquist theory, the sampling rate should be greater than the bandwidth of the band pass filter. When temperature causes the crystal's frequency slightly varying, the beat frequency varies too, thus both phase-locked-loop will response simultaneously. The SC-cut crystal is encapsulated by the temperature controlled oven, which should limit the operating temperature range to ±1° C. This will make the SC-cut crystal oscillator 5 accuracy to $2\times10^{7}$. Both the oven temperature and the oscillator's power supply are periodically sensed by the Microcontroller for proper working condition. For better result, magnetic shield and vibration absorb should be taken into consideration. This loop works un-interruptly, always tracking the change of the crystal's beat frequency (the difference between the 3rd harmonic and the third overtone). This tracking data will be processed with loop #2 via the "Look-Up Table" 21. The table should have initial value put in from previous test data or computer calculation to help the system cold-start.

Figure 4:
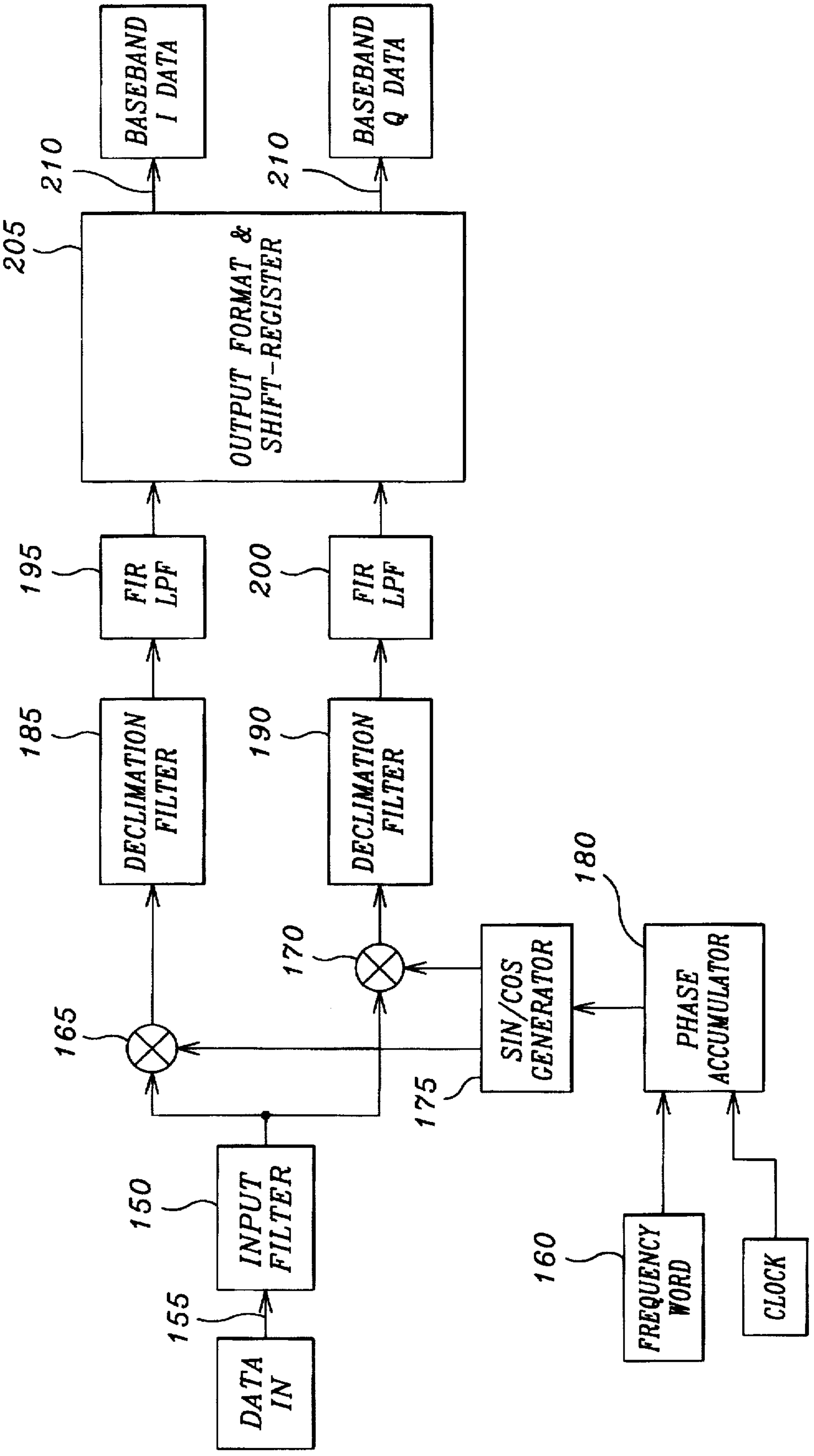
FIG. 4 shows a typical digital quadrature down converter used in the beat frequency tracking loop.

FIG. 4 is the expansion of the Baseband Signal Processor block 65. There shows an input register 150, which temporarily stores the data from A/D converter. The NCO has a 32-Bit phase accumulator 180. It interfaces with the microcontroller 30 (in FIGS. 1 and 2), takes the frequency word, and continuously accumulates the phase step. The SIN/COS generator 175 converts the accumulated phase into quadrature amplitude then the multipliers 165 and 170 do the complex multiplication. The I and Q products are separately filtered first by the decimation linear phase filters 185 and 190, then by the FIR low pass filters 195 and 200 to reject all high frequency components. The micro-computer takes the filtered I/Q pair data from the Output-Formatter 205, finds the phase error from $$\theta=\tan^{-1}(Q/I).$$

The phase error is processed with a single pole loop filters by software. NCO frequency is updated for phase and frequency correction as a result. This is a linear discrete time second order system.

Figure 3:
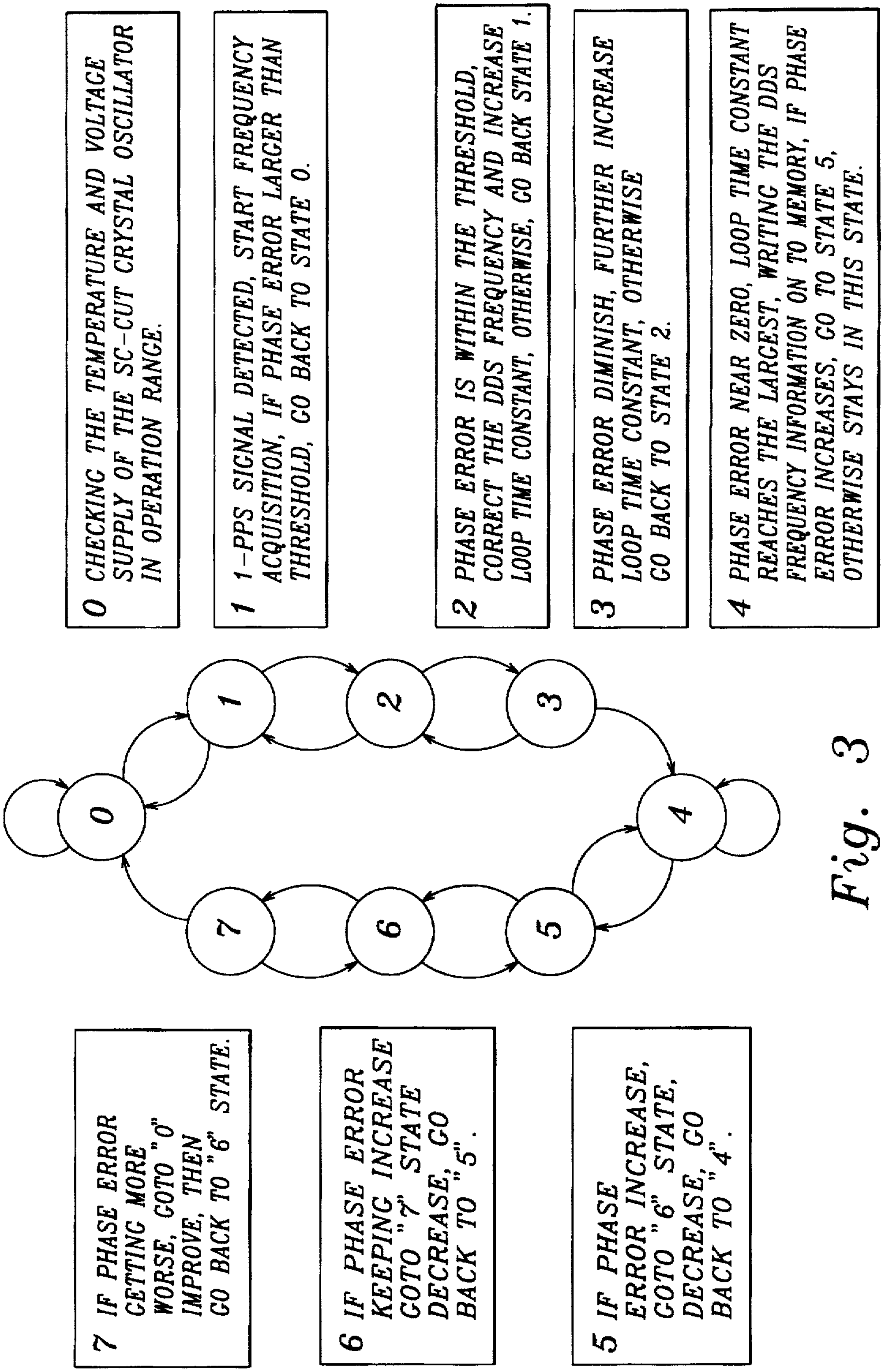
FIG. 3 is a state diagram illustrating the control 30 firmware functions for acquisition, tracking of the GPS receiver's signal, and determining the operational Mode.

FIG. 3 illustrates the algorithm for satellite frequency tracking. It has three operating modes: (1) Acquisition, (2) Steady State frequency tracking, (3) Free run. The mode to be operated is set by a "phase error threshold". Knowing the crystal oscillator's tolerance, one should be able to find its maximum error bond. From 'Acquisition Mode' going to 'Steady Tracking Mode' takes a long time. Transition from State to State occurs gradually, because the smaller the error, the longer time required to find it. In State '0', the observation period is short (that is the loop time constant is small).In State '1', '2', '3' and '4', the time constant increases exponentially. When the GPS receiver's 1PPS output phase noise increases, the control state will go from State '4' to State '5'; if the noise continues worse, then, goes to State '6' and '7' for further time reduction.

What is claimed:

1. A Look-Up Table system for use with a satellite outputting an accurate clock signal comprising:

a Read/Write RAM and control device;

a micro computer controlled crystal oscillator having a crystal;

means, for storing and retrieving data contained in a calibration look-up table, said table containing data relating said crystal's frequency characteristics and a GPS satellite time reference, frequency accuracy in a crystal oscillator time system;

a GPS satellite synchronous direct digital synthesizer:

recording means, connected to the direct digital synthesizer and said crystal oscillator, for outputting an accurate clock signal when the satellite is in view and recording information in said look-up table of the frequency of said direct digital synthesizer versus the frequency of said micro computer controlled crystal oscillator as the frequency of said crystal oscillator drifts.

2. The Look-Up Table system for use with a satellite as recited in claim 1 wherein said crystal oscillator is an SC-cut crystal oscillator.

* * * * *